US011221241B2

(12) United States Patent
Kudo

(10) Patent No.: US 11,221,241 B2
(45) Date of Patent: Jan. 11, 2022

(54) MEASUREMENT PROCESSING DEVICE, MEASUREMENT PROCESSING METHOD, AND PROGRAM

(71) Applicant: OMRON Corporation, Kyoto (JP)

(72) Inventor: Masaya Kudo, Osaka (JP)

(73) Assignee: OMRON CORPORATION, Kyoto (JP)

(*) Notice: Subject to any disclaimer, the term of this patent is extended or adjusted under 35 U.S.C. 154(b) by 0 days.

(21) Appl. No.: 16/644,214

(22) PCT Filed: Feb. 28, 2019

(86) PCT No.: PCT/JP2019/007915
§ 371 (c)(1),
(2) Date: Mar. 4, 2020

(87) PCT Pub. No.: WO2019/176570
PCT Pub. Date: Sep. 19, 2019

(65) Prior Publication Data
US 2020/0191624 A1    Jun. 18, 2020

(30) Foreign Application Priority Data
Mar. 15, 2018  (JP) .............................. JP2018-047620

(51) Int. Cl.
*G01D 21/02*   (2006.01)
*G01D 9/00*    (2006.01)
(52) U.S. Cl.
CPC .............. *G01D 21/02* (2013.01); *G01D 9/00* (2013.01)
(58) Field of Classification Search
CPC .................................. G01D 21/02; G01D 9/00
See application file for complete search history.

(56) References Cited

U.S. PATENT DOCUMENTS

| 4,134,684 A | 1/1979 | Jette |
| 2005/0216216 A1* | 9/2005 | Shimada ............... G01K 1/022 |
| | | 702/79 |

(Continued)

FOREIGN PATENT DOCUMENTS

| CN | 101690952 A | 4/2010 |
| CN | 104741393 A | 7/2015 |

(Continued)

OTHER PUBLICATIONS

An English translation of the International Search Report("ISR") of PCT/JP2019/007915 dated May 21, 2019.

(Continued)

*Primary Examiner* — Raymond L Nimox
(74) *Attorney, Agent, or Firm* — Metrolex IP Law Group, PLLC

(57) ABSTRACT

A measurement processing device includes: a storage section; a first obtaining section configured to obtain a first signal which is outputted from a first device and indicates a measurement result of measurement of a measurement target object; a temporary storage section configured to store the first signal obtained by the first obtaining section; a second obtaining section configured to obtain a second signal which is outputted from a second device and indicates (i) a position of the measurement target object or (ii) an amount of change which is in accordance with the position of the measurement target object, the second device being different from the first device; a storage control section configured to cause the storage section to store measurement information in which the second signal which has been obtained is associated with the first signal which has been stored in the temporary storage section; and an output control section configured to output, to a control device, at least one measurement infor- (Continued)

mation among the measurement information stored in the storage section.

18 Claims, 5 Drawing Sheets

(56) References Cited

U.S. PATENT DOCUMENTS

| | | | | |
|---|---|---|---|---|
| 2008/0117992 A1* | 5/2008 | Murokita | ............ | G01D 5/24452 375/250 |
| 2012/0065917 A1* | 3/2012 | Takahashi | ............. | G06F 3/0346 702/104 |
| 2013/0298415 A1* | 11/2013 | Kanto | .................... | G01B 21/20 33/503 |
| 2015/0301074 A1* | 10/2015 | Yonezawa | ............. | G01P 15/125 702/141 |
| 2018/0063606 A1* | 3/2018 | Hada | ........................ | H03M 1/12 |
| 2018/0177437 A1* | 6/2018 | Yoshioka | ................ | G06F 1/324 |

FOREIGN PATENT DOCUMENTS

| | | | |
|---|---|---|---|
| EP | 3267148 A1 | | 1/2018 |
| JP | S55-40924 A | | 3/1980 |
| JP | S5540924 A | * | 3/1980 |
| JP | 2001-036300 A | | 2/2001 |
| JP | 2005-257482 A | | 9/2005 |
| JP | 2016-017839 A | | 2/2016 |
| KR | 20040058742 A | | 7/2004 |

OTHER PUBLICATIONS

The Written Opinion("WO") of PCT/JP2019/007915 dated May 21, 2019.
The Chinese Office Action (CNOA) dated May 19, 2021 in a counterpart Chinese patent application.
Li Zhiming, "Research On Shape Signal Processing for Shape Meter of Entire Roller Embedded With Elastic Blocks and Shape Closed-Loop Control Method", Thesis, Oct. 15, 2012, p. I-V, VII-X, 1-129, Yanshan University.
Extended European search report (EESR) dated Oct. 21, 2021 in a counterpart European patent application.

* cited by examiner

MEASUREMENT PROCESSING DEVICE, MEASUREMENT PROCESSING METHOD, AND PROGRAM

TECHNICAL FIELD

The present invention relates to a measurement processing device, a measurement processing method, and a program.

BACKGROUND ART

With a measurement application, it is common to use a dedicated measuring device to measure conditions of a measurement target object, in a case where the conditions are those which cannot be checked by visual observation, such as, for example, unevenness of a surface of a chip component. For example, to conduct an examination, with use of a sensor, of unevenness of a surface of a measurement target object, the surface of the measurement target object is scanned with use of a displacement sensor or the like. A measurement application system in such a case is configured, for example, such that the measurement target object is placed on a transferring device and transferred at a constant speed in a constant direction. The displacement sensor is placed above the transferring device (a region through which the measurement target object passes). This allows the displacement sensor to detect a change in distance to the surface of the measurement target object, so that unevenness of the surface can be measured.

In order to examine unevenness of the surface, a measurement point and a measurement result need to be recorded in association with each other. Generally, the displacement sensor carries out the measurement sequentially at a constant sampling cycle, so that measurement results are generated as time-series data. As such, a measurement point is calculated from (i) an elapsed time from a start of the measurement and (ii) a transferring speed, and the measurement point thus calculated is associated with a measurement result. However, the conventional device described above is based on an assumption that the measurement target object is transferred at a constant transferring speed. Accordingly, if any change occurs in the transferring speed, the accuracy of calculation of the measurement point decreases.

Meanwhile, for example, Patent Literature 1 discloses a technique in which (i) an encoder which generates a pulse in accordance with a transfer amount is coupled to a transferring device and (ii) every time there is a certain amount of change in the pulse supplied from the encoder, a measurement controller carries out interrupt processing for taking in a measurement result of measurement carried out by a displacement sensor. With this technique, a measurement point is calculated on the basis of a transfer amount instead of an elapsed time, so that the accuracy of calculation of the measurement point is improved.

CITATION LIST

Patent Literature

[Patent Literature 1]

Japanese Patent Application Publication Tokukai No. 2005-257482

SUMMARY OF INVENTION

Technical Problem

However, the technique described in Patent Literature 1 has a problem that performing the interrupt processing causes significant overhead and thus prevents increasing a sampling speed. In a case of, for example, carrying out measurement of a condition of a measurement target object which condition cannot be checked by visual observation (such as unevenness of a surface of a chip component), the measurement is carried out with respect to many measurement points that are located at close intervals. This makes it necessary to take measurement data in at high speed, but it is difficult to record the measurement data with use of a general-purpose controller.

The present invention has been made in view of the above problem. It is an object of the present invention to provide a measurement processing device, a measurement processing method, and a program which make it possible to record measurement data at a higher speed while improving the accuracy of calculation of a measurement point.

Solution to Problem

An aspect of the present invention is a measurement processing device, including: a storage section; a first obtaining section configured to obtain a first signal which is outputted from a first device and indicates a measurement result of measurement of a measurement target object; a temporary storage section configured to store the first signal obtained by the first obtaining section; a second obtaining section configured to obtain a second signal which is outputted from a second device and indicates (i) a position of the measurement target object or (ii) an amount of change which is in accordance with the position of the measurement target object, the second device being different from the first device; a storage control section configured to cause the storage section to store measurement information in which the second signal which has been obtained is associated with the first signal which has been stored in the temporary storage section; and an output control section configured to output, to a control device, at least one measurement information among the measurement information stored in the storage section.

An aspect of the present invention is a measurement processing method, including: a first obtaining step of obtaining a first signal which is outputted from a first device and indicates a measurement result of measurement of a measurement target object; a temporary storage step of storing the first signal obtained by the first obtaining step; a second obtaining step of obtaining a second signal which is outputted from a second device and indicates (i) a position of the measurement target object or (ii) an amount of change which is in accordance with the position of the measurement target object, the second device being different from the first device; a storage control step of causing a storage section to store measurement information in which the second signal which has been obtained is associated with the first signal which has been stored by the temporary storage step; and an output control step of outputting, to a control device, at least one measurement information among the measurement information stored in the storage section.

An aspect of the present invention is a program for causing a computer to carry out: a first obtaining step of obtaining a first signal which is outputted from a first device and indicates a measurement result of measurement of a measurement target object; a temporary storage step of storing the first signal obtained by the first obtaining step; a second obtaining step of obtaining a second signal which is outputted from a second device and indicates (i) a position of the measurement target object or (ii) an amount of change which is in accordance with the position of the measurement target object, the second device being different from the first device; a storage control step of causing a storage section to store measurement information in which the second signal which has been obtained is associated with the first signal which has been stored by the temporary storage step; and an output control step of outputting, to a control device, at least one measurement information among the measurement information stored in the storage section.

An aspect of the present invention is a measurement processing device, including: a storage section; a first obtaining section configured to obtain a first signal which is outputted from a first device and indicates (i) a position of a measurement target object or (ii) an amount of change which is in accordance with the position of the measurement target object; a temporary storage section configured to store the first signal obtained by the first obtaining section; a second obtaining section configured to obtain a second signal which is outputted from a second device and indicates a measurement result of measurement of the measurement target object, the second device being different from the first device; a storage control section configured to cause the storage section to store measurement information in which the second signal which has been obtained is associated with the first signal which has been stored in the temporary storage section; and an output control section configured to output, to a control device, at least one measurement information among the measurement information stored in the storage section.

An aspect of the present invention is a measurement processing method, including: a first obtaining step of obtaining a first signal which is outputted from a first device and indicates (i) a position of a measurement target object or (ii) an amount of change which is in accordance with the position of the measurement target object; a temporary storage step of storing the first signal obtained by the first obtaining step; a second obtaining step of obtaining a second signal which is outputted from a second device and indicates a measurement result of measurement of the measurement target object, the second device being different from the first device; a storage control step of causing a storage section to store measurement information in which the second signal which has been obtained is associated with the first signal which has been stored by the temporary storage step; and an output control step of outputting, to a control device, at least one measurement information among the measurement information stored in the storage section.

An aspect of the present invention is a program for causing a computer to carry out: a first obtaining step of obtaining a first signal which is outputted from a first device and indicates (i) a position of a measurement target object or (ii) an amount of change which is in accordance with the position of the measurement target object; a temporary storage step of storing the first signal obtained by the first obtaining step; a second obtaining step of obtaining a second signal which is outputted from a second device and indicates a measurement result of measurement of the measurement target object, the second device being different from the first device; a storage control step of causing a storage section to store measurement information in which the second signal which has been obtained is associated with the first signal which has been stored by the temporary storage step; and an output control step of outputting, to a control device, at least one measurement information among the measurement information stored in the storage section.

Advantageous Effects of Invention

The present invention makes it possible to record measurement data at a higher speed while improving the accuracy of calculation of a measurement point.

DESCRIPTION OF EMBODIMENTS

Embodiment 1

Figure 1:
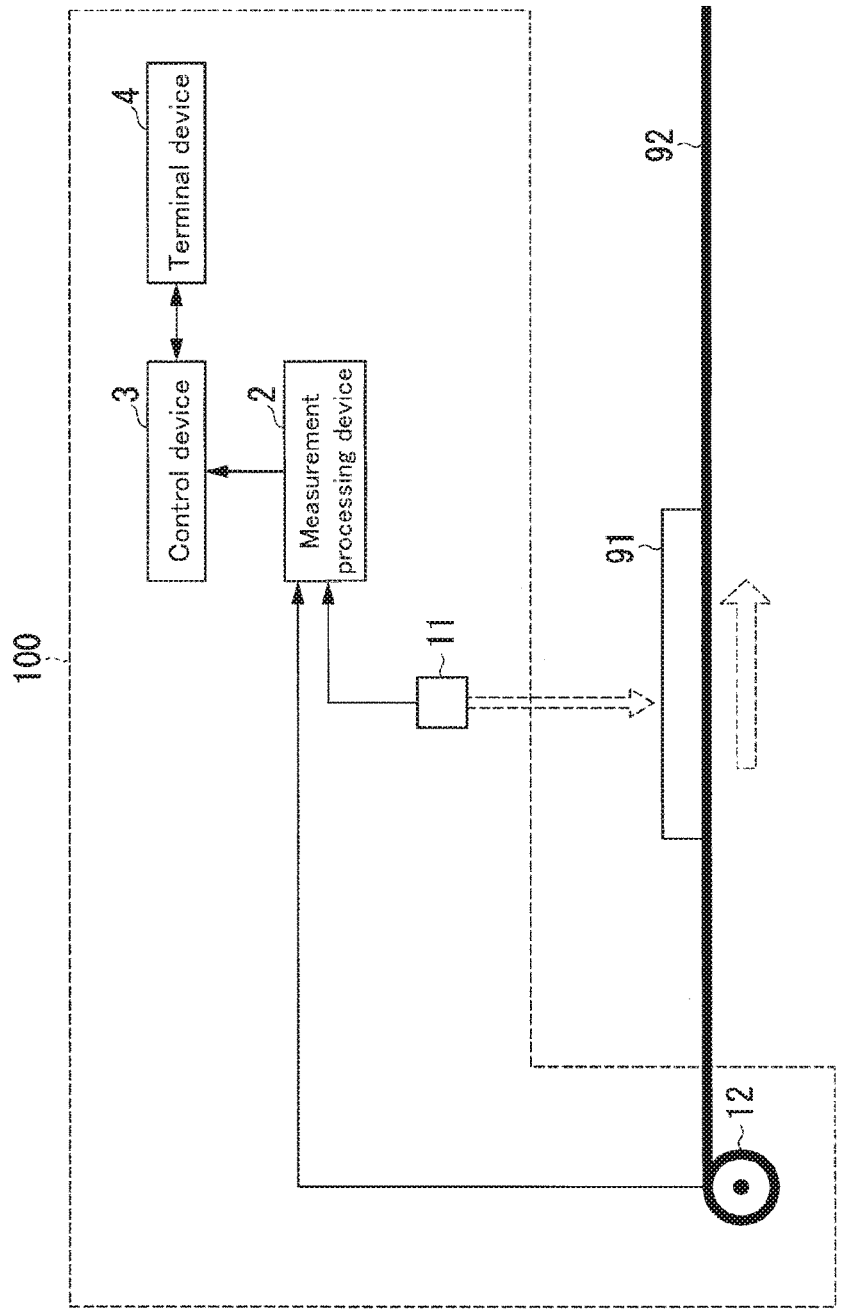
FIG. 1 is a view schematically illustrating measurement carried out by a measurement system 100 in accordance with Embodiment 1.

The following description will discuss a measurement system 100 in accordance with Embodiment 1 of the present invention, with reference to the drawings. FIG. 1 is a view schematically illustrating measurement carried out by the measurement system 100.

The measurement system 100 is a system that measures a feature and/or a condition of an object with use of an input device such as a sensor. As illustrated in FIG. 1, a measurement target object 91, which is an object with respect to which the measurement system 100 carries out measurement, is transferred from the left side to the right side by a transferring member 92 of a transferring device. The measurement system 100 includes a first device 11, a second device 12, a measurement processing device 2, a control device 3, and a terminal device 4.

The first device 11 measures a feature and/or a condition of the measurement target object 91, at regular intervals (e.g., every 5 microseconds). The first device 11 generates a first signal which is an analog signal indicating a measurement result. The first device 11 outputs the first signal which has been generated to the measurement processing device 2.

The second device 12 measures (i) a position of the measurement target object 91 or (ii) an amount of change which is in accordance with the position of the measurement target object 91. The second device 12 generates a second signal which is a digital signal (e.g., a pulse signal) indicating the position or the amount of change, every time the position has reached a predetermined position or every time the amount of change has reached a certain amount of change. The second device 12 outputs the second signal which has been generated to the measurement processing device 2.

While measurement processing is performed by the measurement system 100, the measurement processing device 2 has stored therein at least the most recently inputted first signal among first signals periodically inputted from the first device 11. Every time the second signal is inputted from the second device 12, the measurement processing device 2 calculates a measurement point on the basis of a position or an amount of change that are based on the second signal which has been inputted. The measurement processing device 2 generates and stores measurement data (measurement information), which is data in which the measurement point which has been calculated is associated with a measurement result that is based on the most recently inputted first signal.

The measurement processing device 2 transmits a measurement data group, which has been accumulated, to the control device 3 at a predetermined timing (e.g., periodically). The control device 3 receives and stores the measurement data group transmitted from the measurement processing device 2. The terminal device 4 is used by a user of the measurement system 100 to enter various inputs for operating the control device 3.

(Configuration of Measurement System)

Figure 2:
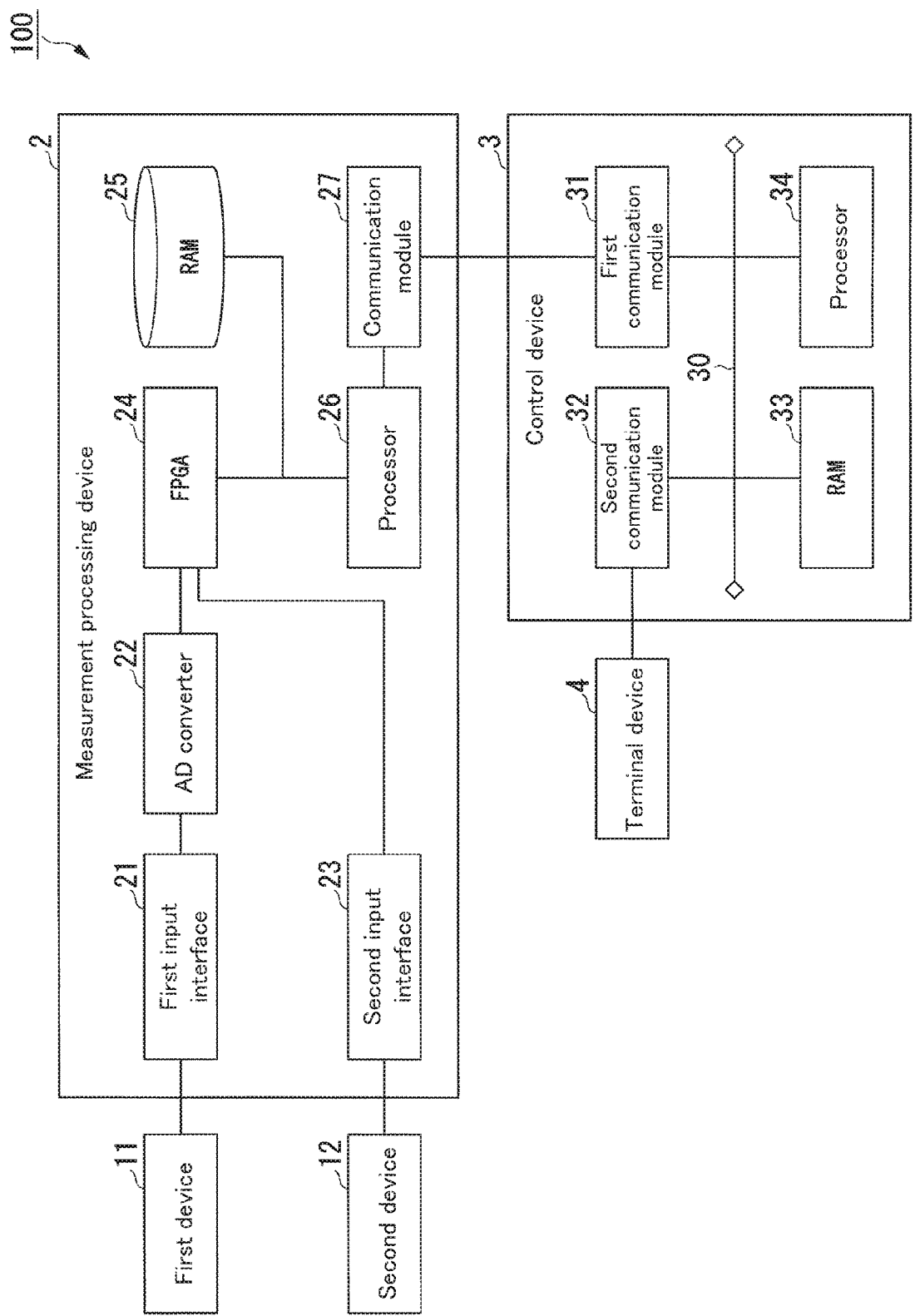
FIG. 2 is a block diagram illustrating a specific example of a configuration of the measurement system 100 in accordance with Embodiment 1.

The following description will discuss a configuration of the measurement system 100 in accordance with Embodiment 1 in more detail, with reference to the drawings. FIG. 2 is a block diagram illustrating a specific example of the configuration of the measurement system 100.

As illustrated in FIG. 2, the measurement system 100 includes the first device 11, the second device 12, the measurement processing device 2, the control device 3, and the terminal device 4.

The first device 11 is an input device configured to measure a feature and/or a condition of the measurement target object 91. The first device 11 outputs the first signal, which indicates the measurement result, to the measurement processing device 2. Here, it is assumed that the first device 11 is a displacement sensor configured to measure distances to the measurement target object 91 in order to determine an external shape of the measurement target object 91. The first device 11 generates an analog signal that is based on the thus measured distances to the measurement target object 91. The first device 11 outputs the analog signal thus generated, i.e., the first signal, to the measurement processing device 2.

Note that the first device 11 may be, for example, an ultrasonic sensor configured to measure a distance to the measurement target object 91, a length-measuring sensor configured to measure a width and/or position of the measurement target object 91, a photoelectric sensor configured to detect a change in surface condition, a temperature sensor configured to measure a surface temperature of the measurement target object, an image sensor configured to perform image processing for calculating a feature amount (for example, area, centroid, length, and position) of the measurement target object, or the like.

The second device 12 is an input device that measures (i) a position of the measurement target object 91 or (ii) an amount of change which is in accordance with the position of the measurement target object 91. The second device 12 outputs the second signal, which is a digital signal indicating the position or the amount of change, to the measurement processing device 2 every time the position has reached a predetermined position or every time the amount of change has reached a certain amount of change. Here, it is assumed that the second device 12 is an angle position sensor (e.g., a rotary encoder) that measures a rotational displacement amount of a rotation axis that drives the transferring member 92 (e.g., a conveyor belt) of the transferring device that transfers the measurement target object 91. The second device 12 converts the rotational displacement amount of the rotation axis into a digital signal with reference to a built-in disk. The second device 12 outputs the digital signal into which the rotational displacement amount has been converted, i.e., the second signal, to the measurement processing device 2.

Note that the second device 12 may be, for example, a position measurement sensor that detects a particular part of the transferring member 92 and carries out measurement with respect to the position which has been detected.

As described above, the second device 12 is a device which carries out measurement with respect to (i) a target that is also a target of measurement carried out by the first device 11 or (ii) a target that is associated with a target of measurement carried out by the first device 11.

The measurement processing device 2 is configured with use of an information processing device. The measurement processing device 2 is, for example, an analog-digital (AD) conversion device having an information processing function. As illustrated in FIG. 2, the measurement processing device 2 includes a first input interface 21, an AD converter 22, a second input interface 23, an FPGA 24 (Field-Programmable Gate Array), a RAM 25 (Random Access Memory), a processor 26, and a communication module 27.

The first input interface 21 (a first obtaining section) is an input interface for an analog signal. The first input interface 21 connects the first device 11 with the AD converter 22, and outputs the first signal, which is a time-series analog signal outputted from the first device 11, to the AD converter 22.

The AD converter 22 (an analog-digital converter) converts the first signal, which is the analog signal inputted via the first input interface 21, into a digital signal. Specifically, the AD converter 22 convers the analog signal into the digital signal by (i) sampling the analog signal at a sampling cycle of approximately several microseconds and (ii) quantizing the analog signal, which has been sampled, at a predetermined quantization level. The AD converter 22 outputs the first signal, which has been converted into the digital signal, to the FPGA 24.

The second input interface 23 (a second obtaining section) is an input interface for a digital signal. The second input interface 23 connects the second device 12 with the FPGA 24 and outputs, to the FPGA 24, a time-series digital signal outputted from the second device 12.

The FPGA 24 is a configuration-configurable integrated circuit. Specifically, the measurement processing device 2 stores, in advance in the RAM 25, configuration data for configuring the FPGA 24 as a circuit for performing arithmetic processing. During start-up of the measurement processing device 2, the FPGA 24 (i) obtains from the processor 26 the configuration data read out from the RAM 25 and (ii) configures the measurement processing device 2 itself as the circuit for arithmetic processing, by performing a process of configuring (generally called "configuration") a logic circuit on the basis of the configuration data which has been obtained.

The FPGA 24 configured as the circuit for performing arithmetic processing performs arithmetic processing on the first signal, which has been converted into the digital signal by the AD converter 22, and on the second signal, which is the digital signal inputted via the second input interface 23. The FPGA 24 stores, in the RAM 25, the data measurement data which has been generated by the arithmetic processing and in which the first signal and the second signal are associated with each other. Note that a functional configuration of an arithmetic processing function implemented in the FPGA 24 will be described in detail later.

The RAM 25 is a writable and accessible storage medium configured with use of, for example, a semiconductor memory such as an SRAM (Static Random Access Memory) or a DRAM (Dynamic Random Access Memory). The RAM 25 stores the measurement data generated by the FPGA 24.

The processor 26 is, for example, an arithmetic processing device such as a CPU (Central Processing Unit). As described above, during start-up of the measurement processing device 2, the processor 26 reads out configuration data from the RAM 25 and outputs the configuration data which has been read out to the FPGA 24. Further, the processor 26 (an output control section) obtains, at a predetermined timing (e.g., periodically), a measurement data group stored in the RAM 25, and transmits the measurement data group which has been obtained to the control device 3 via the communication module 27.

The communication module 27 is a communication interface for the measurement processing device 2 to communicate with the control device 3. The communication module 27 is connected to the first communication module 31 of the control device 3 and transmits to the control device 3 the measurement data group which has been stored in the RAM 25 after being subjected to arithmetic processing by the FPGA 24.

Further, the RAM 25 and the processor 26 carry out various processes for enabling the measurement processing device 2 to operate. Specifically, the processor 26 reads out a program, which has been stored in an auxiliary storage device (not illustrated), into the RAM 25 and executes the program. Through the execution of the program, the measurement processing device 2 functions as a device having the above-described functional configuration, and performs processes such as generating, recording, and outputting measurement data.

The control device 3 is configured with use of an information processing device. The control device 3 is, for example, a PLC (Programmable Logic Controller). As illustrated in FIG. 2, the control device 3 includes a first communication module 31, a second communication module 32, a RAM 33, and a processor 34.

The first communication module 31 is a communication interface for the control device 3 to communicate with the measurement processing device 2.

The first communication module 31 is connected to the communication module 27 of the measurement processing device 2 and receives the measurement data group transmitted from the measurement processing device 2. The measurement data group received by the first communication module 31 is stored in the RAM 33.

The second communication module 32 is a communication interface for the control device 3 to communicate with the terminal device 4. The second communication module 32 is connected to a communication interface (not illustrated) provided in the terminal device 4, and transmits and receives various kinds of information to and from the terminal device 4.

The RAM 33 is configured with use of a writable and accessible storage medium. The RAM 33 includes, for example, a semiconductor storage device such as a SRAM or a DRAM, a magnetic disk device such as an HDD (Hard Disk Drive), a magneto-optical disk device, or a combination of these storage devices. The RAM 33 stores the measurement data group which the first communication module 31 has received from the measurement processing device 2.

The processor 34 is, for example, an arithmetic processing device such as a CPU.

The RAM 33 and the processor 34 carry out various processes for enabling the control device 3 to operate. Specifically, the processor 34 reads out a program, which has been stored in an auxiliary storage device (not illustrated), into the RAM 33 and executes the program. Through the execution of the program, the control device 3 functions as a device having the above-described functional configuration, and performs processes such as recording and outputting measurement data.

The terminal device 4 is an information processing device such as a PC (Personal Computer), a workstation, a smart phone, a mobile phone, and a tablet device. The terminal device 4 is configured to be able to communicate with the control device 3. The terminal device 4 is used by a user of the measurement system 100 to enter various inputs for operating the control device 3.

(Functional Configuration of Arithmetic Processing Function)

Figure 3:
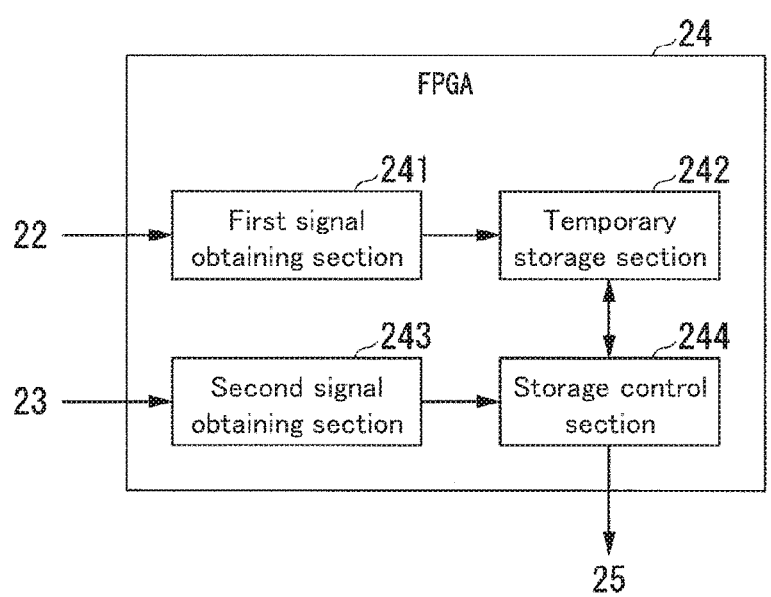
FIG. 3 is a block diagram illustrating a specific example of a functional configuration of an arithmetic processing function implemented in an FPGA 24 in accordance with Embodiment 1.

With reference to the drawings, the following description will discuss the functional configuration of the arithmetic processing function implemented in the FPGA 24. FIG. 3 is a block diagram illustrating a specific example of the functional configuration of the arithmetic processing function implemented in the FPGA 24.

As illustrated in FIG. 3, the FPGA 24 is provided with functions of a first signal obtaining section 241, a temporary storage section 242, a second signal obtaining section 243, and a storage control section 244.

The first signal obtaining section 241 stores, in the temporary storage section 242, the first signal inputted from the AD converter 22. At this time, in a case where a first signal that was stored in the past is already stored in the temporary storage section 242, the first signal that was stored in the past may be updated with the first signal that has been newly obtained.

The temporary storage section 242 temporarily stores at least the most recently inputted first signal among first signals periodically inputted from the first signal obtaining section 241.

The second signal obtaining section 243 outputs, to the storage control section 244, the second signal inputted from the second input interface 23.

Upon receiving the second signal from the second signal obtaining section 243, the storage control section 244 obtains the most recently inputted first signal stored in the temporary storage section 242. The storage control section 244 calculates a measurement point on the basis of the rotational displacement amount that is based on the second signal which has been inputted. The storage control section 244 generates measurement data, which is data in which the measurement point which has been calculated is associated with a measurement result that is based on the most recently inputted first signal. The storage control section 244 stores, in the RAM 25, the measurement data which has been generated.

(Example of Arithmetic Processing)

Figure 4:
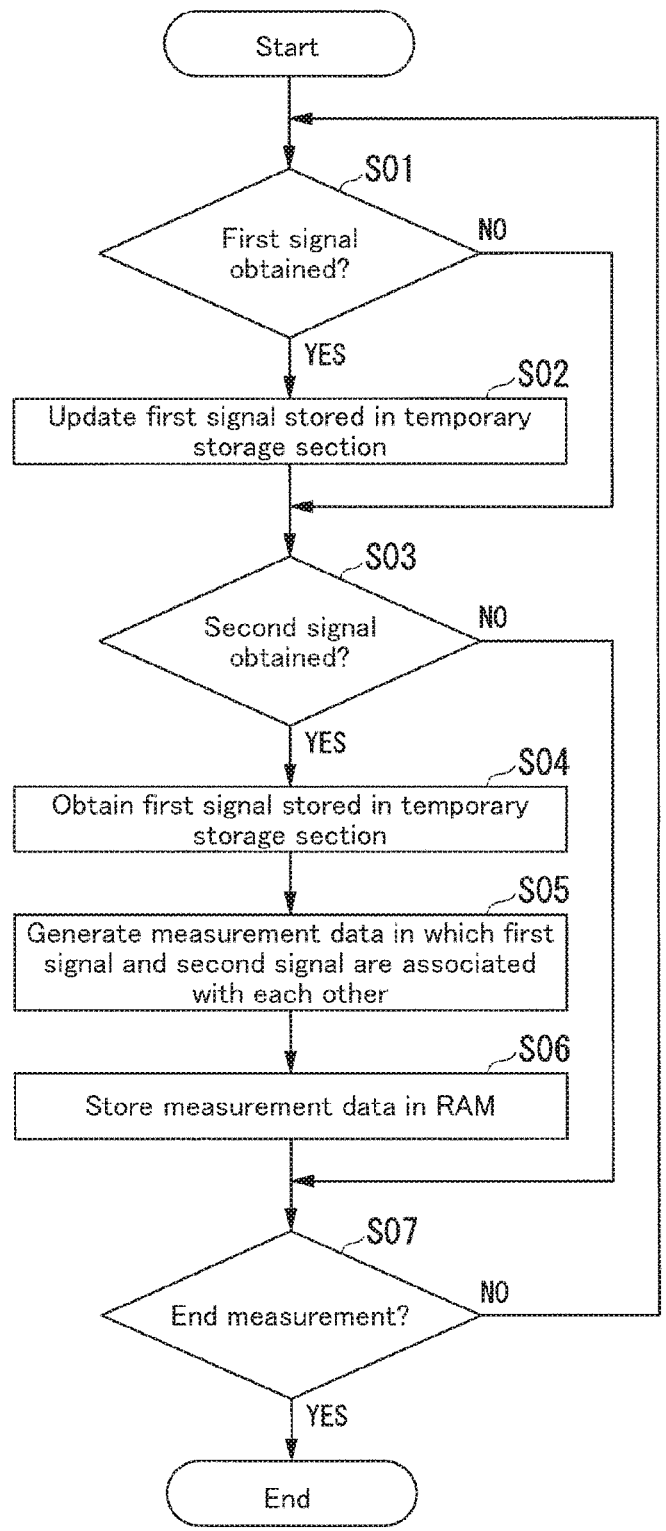
FIG. 4 is a flowchart illustrating an example of arithmetic processing carried out by a measurement processing device 2 in accordance with Embodiment 1.

With reference to the drawings, the following description will discuss an example of arithmetic processing performed by the FPGA 24 of the measurement processing device 2. FIG. 4 is a flowchart illustrating an example of the arithmetic processing.

In a case where the first signal obtaining section 241 obtains, via the AD converter 22, a first signal outputted from the first device 11 (YES at step S01), the first signal obtaining section 241 updates, with the first signal thus newly obtained, a first signal that was obtained in the past and is stored in the temporary storage section 242 (step S02).

On the other hand, while the first signal obtaining section 241 obtains no first signal outputted from the first device 11 (NO at step S01), the first signal obtaining section 241 takes no action.

In a case where the second signal obtaining section 243 obtains a second signal outputted from the second device 12 (YES at step S03), the second signal obtaining section 243 outputs the second signal which has been obtained to the storage control section 244. On the other hand, while the second signal obtaining section 243 obtains no second signal outputted from the second device 12, (NO at step S03), the second signal obtaining section 243 takes no action.

In a case where the second signal is inputted into the storage control section 244 from the second signal obtaining section 243, the storage control section 244 obtains the first signal stored in the temporary storage section 242 (step S04). The storage control section 244 calculates a measurement point on the basis of the rotational displacement amount that is based on the second signal. The storage control section 244 generates measurement data (step S05), which is data in which the measurement point which has been calculated is associated with a measurement result that is based on the first signal. The storage control section 244 stores, in the RAM 25, the measurement data which has been generated.

Variation of the Embodiment 1

The above description of Embodiment 1 has discussed a configuration in which, every time a second signal is inputted into the measurement processing device 2 from the second device 12, the measurement processing device 2 (i) calculates a measurement point and (ii) generates measurement data, which is data in which the measurement point which has been calculated is associated with a measurement result that is based on the most recently inputted first signal. However, Embodiment 1 is not limited to this configuration.

For example, it is possible to employ a configuration in which (i) information indicating a plurality of predetermined positions is stored in advance in a storage medium (e.g., the RAM 25) and (ii) every time a position indicated by the second signal reaches a predetermined position stored in advance in the storage medium, the measurement processing device 2 calculates a measurement point and generates measurement data.

Alternatively, for example, it is possible to employ a configuration in which (i) information indicating a predetermined amount of change is stored in advance in a storage medium (e.g., the RAM 25) and (ii) every time an amount of change indicated by the second signal reaches a predetermined amount of change stored in advance in the storage medium, the measurement processing device 2 calculates a measurement point and generates measurement data.

Note that, generally, the second signal, which is a digital signal indicating a position or an amount of change, often has a higher resolution than the first signal, which is an analog signal indicating a measurement result. Accordingly, the amount of measurement data generated by the measurement processing device 2 in accordance with Embodiment 1 described above may be enormous. In contrast, the configuration of the measurement processing device 2 in accordance with the above variation makes it possible to generate only a necessary amount of measurement data, and thus limit the amount of measurement data which is generated.

The above description of Embodiment 1 has discussed a configuration in which, every time a second signal is inputted into the measurement processing device 2 from the second device 12, the measurement processing device 2 calculates a measurement point and generates measurement data, which is data in which the measurement point which has been calculated is associated with a measurement result that is based on the most recently inputted first signal. However, Embodiment 1 is not limited to this configuration.

For example, it is possible to employ a configuration in which, every time a first signal (a signal indicating a measurement result) is inputted into the measurement processing device 2 from the first device 11, the measurement processing device 2 calculates a measurement point on the basis of the most recently inputted second signal (a signal indicating a position or an amount of change) and generate measurement data in which the measurement point which has been calculated is associated with the measurement result that is based on the first signal which has been inputted. In such a case, the second signal (the signal indicating the position or the amount of change) is temporarily stored in the temporary storage section 242 instead of the first signal (the signal indicating the measurement result).

Embodiment 2

Figure 5:
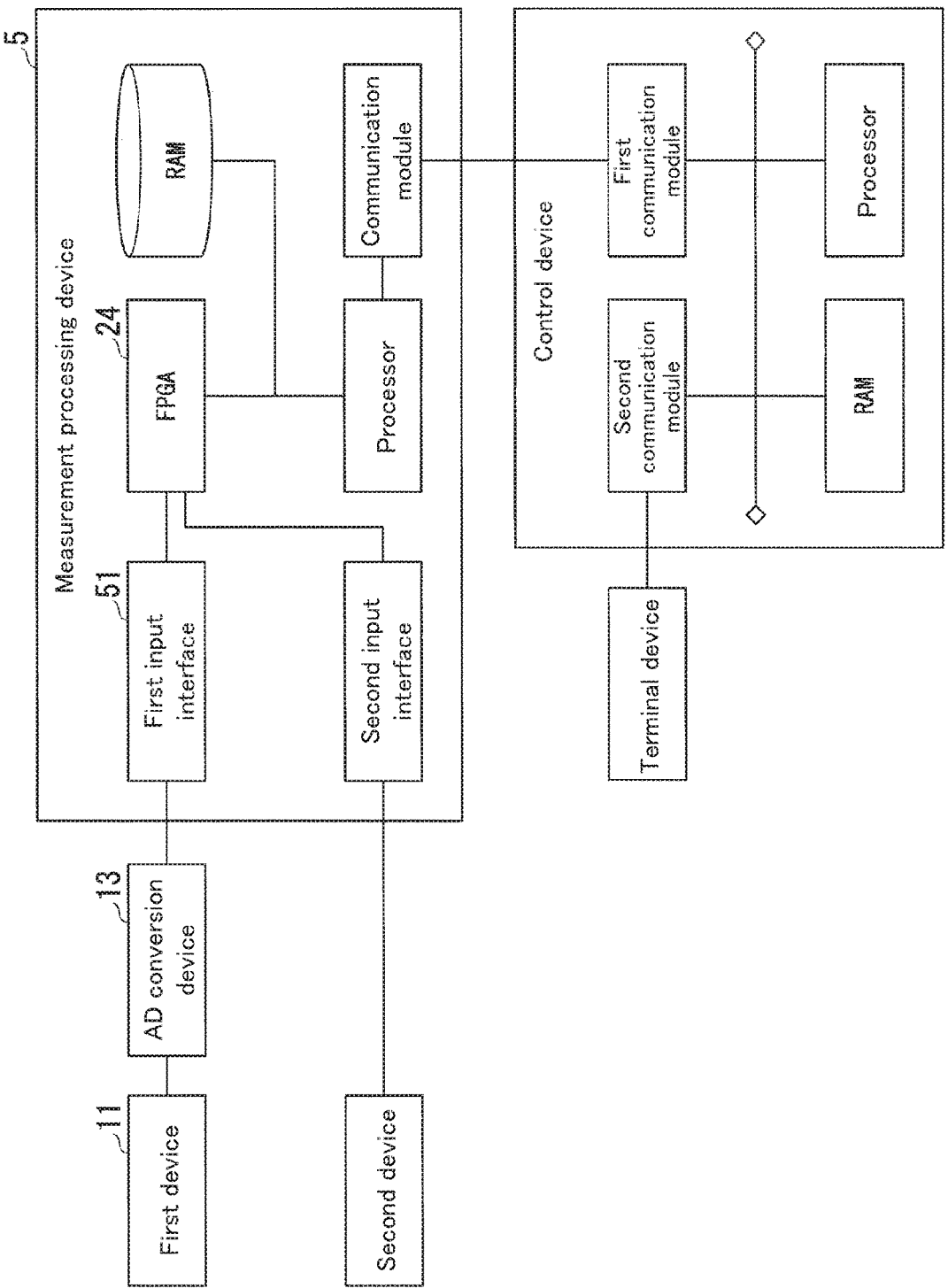
FIG. 5 is a block diagram illustrating a specific example of a configuration of a measurement system 200 in accordance with Embodiment 2.

The following description will discuss a measurement system 200 in accordance with Embodiment 2 of the present invention, with reference to the drawings. FIG. 5 is a diagram illustrating a specific example of a configuration of the measurement system 200.

As illustrated in FIG. 5, the configuration of the measurement system 200 in accordance with Embodiment 2 differs from the configuration of the measurement system 100 in accordance with Embodiment 1 described above in that the AD conversion function for converting the first signal, which is an analog signal, into a digital signal is provided in an AD conversion device 13 provided outside a measurement processing device 5.

A first device 11 outputs, to the AD conversion device 13, a first signal indicating a measurement result. The AD conversion device 13 converts the first signal, which is an analog signal inputted from the first device 11, into a digital signal. The AD conversion device 13 outputs, to a first input interface 51, the first signal which has been converted into the digital signal.

The first input interface 51 is an input interface for a digital signal. The first input interface 51 connects the AD conversion device 13 with an FPGA 24, and outputs the first signal, which is a time-series digital signal outputted from the AD conversion device 13, to the FPGA 24.

The rest of the configuration of the measurement system 200 in accordance with Embodiment 2 is the same as the configuration of the measurement system 100 in accordance with Embodiment 1, and therefore the explanation thereof is omitted.

As described above, in the measurement system 100 in accordance with Embodiment 1 described above and the measurement system 200 in accordance with Embodiment 2, the measurement processing device 2 and the measurement processing device 5 obtain a first signal and a second signal. Upon obtaining the first signal and the second signal, the measurement processing device 2 and the measurement processing device 5 generate measurement data in which the second signal is associated with the most recently obtained first signal. The measurement processing device 2 and the measurement processing device 5 accumulate therein the measurement data which has been generated, and collectively transmit a measurement data group to the control device 3 at a predetermined timing.

With the above configuration, according to the measurement system 100 in accordance with Embodiment 1 described above and the measurement system 200 in accordance with Embodiment 2, it is possible to generate measurement data without performing interrupt processing. This allows the measurement system 100 and the measurement system 200 to have a smaller overhead than a conventional measurement controller that performs, every time a pulse provided from an encoder connected to a transferring device changes by a certain amount, interrupt processing of taking in a measurement result of measurement carried out by a displacement sensor. Accordingly, an increase in sampling speed is achieved.

With the above configuration, according to the measurement system 100 in accordance with Embodiment 1 described above and the measurement system 200 in accordance with Embodiment 2, it is possible to (i) accumulate, in their own devices, measurement data which has been generated and (ii) later collectively transmit a measurement data group to the control device 3. This makes it possible to record measurement data faster than a conventional system in which a control device 3 records a measurement result each time measurement data is generated.

With the above configuration, according to the measurement system 100 in accordance with Embodiment 1 described above and the measurement system 200 in accordance with Embodiment 2, a measurement point is calculated on the basis of a position of the measurement object 91 or an amount of change which is in accordance with the position of the measurement target object 91. This allows the measurement system 100 and the measurement system 200 to achieve an improvement in the accuracy of calculation of a measurement point as compared with a conventional system that calculates a measurement point on the basis of (i) an elapsed time from a start of the measurement and (ii) a transferring speed.

Specific configurations of the present invention are not limited to those described in the embodiments described in detail above, and can be altered in many ways.

It should be noted that part or all of the measurement processing device 2 and the measurement processing device 5 in the above-described embodiments may be realized by a computer. In such a case, a program for realizing the control function may be recorded on a computer-readable recording medium, and the program recorded on the recording medium may be read into a computer system and executed by the computer system.

Here, the "computer system" is a computer system built in the measurement processing device 2 and the measurement processing device 5, and encompasses hardware such as an operating system and a peripheral device. The "computer-readable recording medium" refers to (i) a portable medium such as a flexible disk, a magnetic disk, a ROM, or a CD-ROM and (ii) a storage device such as a hard disk incorporated in a computer system.

Further, the "computer-readable recording medium" may encompass (i) a computer-readable recording medium that dynamically holds a program for a short period of time, such as a communication line used in a case where a program is transmitted via a network such as the Internet or via a communication line such as a telephone line and (ii) a computer-readable recording medium that holds a program for a certain period of time, such as a volatile memory inside a computer system serving as a server or a client in that case. The above-described program may realize a part of the above-described functions, or may realize the above-described functions by combining them with a program already recorded in a computer system.

The measurement processing device 2 and the measurement processing device 5 in the above-described embodiments may be realized as an integrated circuit such as an LSI (Large Scale Integration). Functional blocks of each of the measurement processing device 2 and the measurement processing device 5 may be realized as individual processors, or some or all of the functional blocks may be integrated into a processor. The means for realizing the integrated circuit is not limited to LSIs, and may be a dedicated circuit or a general-purpose processor. When a technology for realizing an integrated circuit alternative to LSIs has emerged due to the advancement of semiconductor technology, an integrated circuit realized by the technology may be used.

Aspects of the present invention can also be expressed as follows:

An aspect of the present invention is a measurement processing device, including: a storage section; a first obtaining section configured to obtain a first signal which is outputted from a first device and indicates a measurement result of measurement of a measurement target object; a temporary storage section configured to store the first signal obtained by the first obtaining section; a second obtaining section configured to obtain a second signal which is outputted from a second device and indicates (i) a position of the measurement target object or (ii) an amount of change which is in accordance with the position of the measurement target object, the second device being different from the first device; a storage control section configured to cause the storage section to store measurement information in which the second signal which has been obtained is associated with the first signal which has been stored in the temporary storage section; and an output control section configured to output, to a control device, at least one measurement information among the measurement information stored in the storage section.

In an aspect of the present invention, the measurement processing device is configured such that the storage control section is configured to output the measurement information to the control device in response to the second signal being obtained by the second obtaining section.

In an aspect of the present invention, the measurement processing device is configured such that the storage control section is configured to output the measurement information to the control device in response to the position indicated by the second signal obtained by the second obtaining section reaching a predetermined position.

In an aspect of the present invention, the measurement processing device is configured such that the storage control section is configured to output the measurement information to the control device in response to the amount of change indicated by the second signal obtained by the second obtaining section reaching a predetermined amount of change.

In an aspect of the present invention, the measurement processing device is configured such that: the second device is an angle position sensor configured to measure a rotational displacement amount of a rotation axis of a transferring member which transfers the measurement target object; and the second signal is a digital signal outputted from the angle position sensor in accordance with the rotational displacement amount.

In an aspect of the present invention, the measurement processing device is configured such that the measurement processing device further includes an analog-digital converter configured to convert the first signal from an analog signal into a digital signal, the temporary storage section being configured to store the first signal which has been converted by the analog-digital converter.

An aspect of the present invention is a measurement processing method, including: a first obtaining step of obtaining a first signal which is outputted from a first device and indicates a measurement result of measurement of a measurement target object; a temporary storage step of storing the first signal obtained by the first obtaining step; a second obtaining step of obtaining a second signal which is outputted from a second device and indicates (i) a position of the measurement target object or (ii) an amount of change which is in accordance with the position of the measurement target object, the second device being different from the first device; a storage control step of causing a storage section to store measurement information in which the second signal which has been obtained is associated with the first signal which has been stored by the temporary storage step; and an output control step of outputting, to a control device, at least one measurement information among the measurement information stored in the storage section.

An aspect of the present invention is a program for causing a computer to carry out: a first obtaining step of obtaining a first signal which is outputted from a first device and indicates a measurement result of measurement of a measurement target object; a temporary storage step of storing the first signal obtained by the first obtaining step; a second obtaining step of obtaining a second signal which is outputted from a second device and indicates (i) a position of the measurement target object or (ii) an amount of change which is in accordance with the position of the measurement target object, the second device being different from the first device; a storage control step of causing a storage section to store measurement information in which the second signal which has been obtained is associated with the first signal which has been stored by the temporary storage step; and an output control step of outputting, to a control device, at least one measurement information among the measurement information stored in the storage section.

An aspect of the present invention is a measurement processing device, including: a storage section; a first obtaining section configured to obtain a first signal which is outputted from a first device and indicates (i) a position of a measurement target object or (ii) an amount of change which is in accordance with the position of the measurement target object; a temporary storage section configured to store the first signal obtained by the first obtaining section; a second obtaining section configured to obtain a second signal which is outputted from a second device and indicates a measurement result of measurement of the measurement target object, the second device being different from the first device; a storage control section configured to cause the storage section to store measurement information in which the second signal which has been obtained is associated with the first signal which has been stored in the temporary storage section; and an output control section configured to output, to a control device, at least one measurement information among the measurement information stored in the storage section.

In an aspect of the present invention, the measurement processing device is configured such that the storage control section is configured to output the measurement information to the control device in response to the second signal being obtained by the second obtaining section.

In an aspect of the present invention, the measurement processing device is configured such that the storage control section is configured to output the measurement information to the control device in response to a value of the measurement result indicated by the second signal obtained by the second obtaining section reaching a predetermined value.

In an aspect of the present invention, the measurement processing device is configured such that the storage control section is configured to output the measurement information to the control device in response to the amount of change of the measurement result indicated by the second signal obtained by the second obtaining section reaching a predetermined amount of change.

In an aspect of the present invention, the measurement processing device is configured such that: the first device is an angle position sensor configured to measure a rotational displacement amount of a rotation axis of a transferring member which transfers the measurement target object; and the first signal is a digital signal outputted from the angle position sensor in accordance with the rotational displacement amount.

In an aspect of the present invention, the measurement processing device is configured such that the measurement processing device further includes an analog-digital converter configured to convert the second signal from an analog signal into a digital signal, the temporary storage section being configured to store the second signal which has been converted by the analog-digital converter.

An aspect of the present invention is a measurement processing method, including: a first obtaining step of obtaining a first signal which is outputted from a first device and indicates (i) a position of a measurement target object or (ii) an amount of change which is in accordance with the position of the measurement target object; a temporary storage step of storing the first signal obtained by the first obtaining step; a second obtaining step of obtaining a second signal which is outputted from a second device and indicates a measurement result of measurement of the measurement target object, the second device being different from the first device; a storage control step of causing a storage section to store measurement information in which the second signal which has been obtained is associated with the first signal which has been stored by the temporary storage step; and an output control step of outputting, to a control device, at least one measurement information among the measurement information stored in the storage section.

An aspect of the present invention is a program for causing a computer to carry out: a first obtaining step of obtaining a first signal which is outputted from a first device and indicates (i) a position of a measurement target object or (ii) an amount of change which is in accordance with the position of the measurement target object; a temporary storage step of storing the first signal obtained by the first obtaining step; a second obtaining step of obtaining a second signal which is outputted from a second device and indicates a measurement result of measurement of the measurement target object, the second device being different from the first device; a storage control step of causing a storage section to store measurement information in which the second signal which has been obtained is associated with the first signal which has been stored by the temporary storage step; and an output control step of outputting, to a control device, at least one measurement information among the measurement information stored in the storage section.

REFERENCE SIGNS LIST 2, 5: measurement processing device
3: control device

4: terminal device
11: first device
12: second device
21, 51: first input interface
22: AD converter
23: second input interface
24: FPGA
25: RAM
26: processor
27: communication module
31: first communication module
32: second communication module
33: RAM
34: processor
100, 200: measurement system
241: first signal obtaining section
242: temporary storage section
243: second signal obtaining section
244: storage control section

The invention claimed is:

1. A measurement processing device, comprising:
a storage section;
a first obtaining section configured to obtain a first signal which is outputted from a first device and indicates a measurement result of measurement of a measurement target object;
a temporary storage section configured to store the first signal obtained by the first obtaining section;
a second obtaining section configured to obtain a second signal which is outputted from a second device and indicates (i) a position of the measurement target object or (ii) an amount of change which is in accordance with the position of the measurement target object, the second device being different from the first device;
a storage control section configured to cause the storage section to store measurement information in which the second signal which has been obtained is associated with the first signal which has been stored in the temporary storage section; and
an output control section configured to output, to a control device, at least one measurement information among the measurement information stored in the storage section, wherein
the first obtaining section obtains the first signal and causes the first signal to be stored in the temporary storage section without performing interrupt processing in which the first signal is obtained in accordance with the second signal.

2. The measurement processing device as set forth in claim 1, wherein the storage control section is configured to output the measurement information to the control device in response to the second signal being obtained by the second obtaining section.

3. The measurement processing device as set forth in claim 1, wherein the storage control section is configured to output the measurement information to the control device in response to the position indicated by the second signal obtained by the second obtaining section reaching a predetermined position.

4. The measurement processing device as set forth in claim 1, wherein the storage control section is configured to output the measurement information to the control device in response to the amount of change indicated by the second signal obtained by the second obtaining section reaching a predetermined amount of change.

5. The measurement processing device as set forth in claim 1, wherein:

the second device is an angle position sensor configured to measure a rotational displacement amount of a rotation axis of a transferring member which transfers the measurement target object; and
the second signal is a digital signal outputted from the angle position sensor in accordance with the rotational displacement amount.

6. The measurement processing device as set forth in claim 1, further comprising an analog-digital converter configured to convert the first signal from an analog signal into a digital signal,
the temporary storage section being configured to store the first signal which has been converted by the analog-digital converter.

7. A measurement processing method, comprising:
a first obtaining step of obtaining a first signal which is outputted from a first device and indicates a measurement result of measurement of a measurement target object;
a temporary storage step of storing the first signal obtained by the first obtaining step;
a second obtaining step of obtaining a second signal which is outputted from a second device and indicates (i) a position of the measurement target object or (ii) an amount of change which is in accordance with the position of the measurement target object, the second device being different from the first device;
a storage control step of causing a storage section to store measurement information in which the second signal which has been obtained is associated with the first signal which has been stored by the temporary storage step; and
an output control step of outputting, to a control device, at least one measurement information among the measurement information stored in the storage section,
in the first obtaining step, the first signal is obtained without performing interrupt processing in which the first signal is obtained in accordance with the second signal.

8. A non-transitory computer-readable storage medium that stores a program for causing a computer to carry out:
a first obtaining step of obtaining a first signal which is outputted from a first device and indicates a measurement result of measurement of a measurement target object;
a temporary storage step of storing the first signal obtained by the first obtaining step;
a second obtaining step of obtaining a second signal which is outputted from a second device and indicates (i) a position of the measurement target object or (ii) an amount of change which is in accordance with the position of the measurement target object, the second device being different from the first device;
a storage control step of causing a storage section to store measurement information in which the second signal which has been obtained is associated with the first signal which has been stored by the temporary storage step; and
an output control step of outputting, to a control device, at least one measurement information among the measurement information stored in the storage section,
in the first obtaining step, the first signal is obtained without performing interrupt processing in which the first signal is obtained in accordance with the second signal.

9. A measurement processing device, comprising:
a storage section;

a first obtaining section configured to obtain a first signal which is outputted from a first device and indicates (i) a position of a measurement target object or (ii) an amount of change which is in accordance with the position of the measurement target object;
a temporary storage section configured to store the first signal obtained by the first obtaining section;
a second obtaining section configured to obtain a second signal which is outputted from a second device and indicates a measurement result of measurement of the measurement target object, the second device being different from the first device;
a storage control section configured to cause the storage section to store measurement information in which the second signal which has been obtained is associated with the first signal which has been stored in the temporary storage section; and
an output control section configured to output, to a control device, at least one measurement information among the measurement information stored in the storage section, wherein
the first obtaining section obtains the first signal and causes the first signal to be stored in the temporary storage section without performing interrupt processing in which the first signal is obtained in accordance with the second signal.

10. The measurement processing device as set forth in claim 9, wherein the storage control section is configured to output the measurement information to the control device in response to the second signal being obtained by the second obtaining section.

11. The measurement processing device as set forth in claim 9, wherein the storage control section is configured to output the measurement information to the control device in response to a value of the measurement result indicated by the second signal obtained by the second obtaining section reaching a predetermined value.

12. The measurement processing device as set forth in claim 9, wherein the storage control section is configured to output the measurement information to the control device in response to the amount of change of the measurement result indicated by the second signal obtained by the second obtaining section reaching a predetermined amount of change.

13. The measurement processing device as set forth in claim 9, wherein:
the first device is an angle position sensor configured to measure a rotational displacement amount of a rotation axis of a transferring member which transfers the measurement target object; and
the first signal is a digital signal outputted from the angle position sensor in accordance with the rotational displacement amount.

14. The measurement processing device as set forth in claim 9, further comprising an analog-digital converter configured to convert the second signal from an analog signal into a digital signal,
the temporary storage section being configured to store the second signal which has been converted by the analog-digital converter.

15. A measurement processing method, comprising:
a first obtaining step of obtaining a first signal which is outputted from a first device and indicates (i) a position of a measurement target object or (ii) an amount of change which is in accordance with the position of the measurement target object;
a temporary storage step of storing the first signal obtained by the first obtaining step;
a second obtaining step of obtaining a second signal which is outputted from a second device and indicates a measurement result of measurement of the measurement target object, the second device being different from the first device;
a storage control step of causing a storage section to store measurement information in which the second signal which has been obtained is associated with the first signal which has been stored by the temporary storage step; and
an output control step of outputting, to a control device, at least one measurement information among the measurement information stored in the storage section,
in the first obtaining step, the first signal is obtained without performing interrupt processing in which the first signal is obtained in accordance with the second signal.

16. A non-transitory computer-readable storage medium that stores a program for causing a computer to carry out:
a first obtaining step of obtaining a first signal which is outputted from a first device and indicates (i) a position of a measurement target object or (ii) an amount of change which is in accordance with the position of the measurement target object;
a temporary storage step of storing the first signal obtained by the first obtaining step;
a second obtaining step of obtaining a second signal which is outputted from a second device and indicates a measurement result of measurement of the measurement target object, the second device being different from the first device;
a storage control step of causing a storage section to store measurement information in which the second signal which has been obtained is associated with the first signal which has been stored by the temporary storage step; and
an output control step of outputting, to a control device, at least one measurement information among the measurement information stored in the storage section,
in the first obtaining step, the first signal is obtained without performing interrupt processing in which the first signal is obtained in accordance with the second signal.

17. The measurement processing device as set forth in claim 1, wherein the output control section collectively outputs, at a predetermined timing, a measurement data group stored in the storage section and consisting of the measurement information accumulated in the storage section.

18. The measurement processing device as set forth in claim 9, wherein the output control section collectively outputs, at a predetermined timing, a measurement data group stored in the storage section and consisting of the measurement information accumulated in the storage section.

* * * * *